United States Patent
Doetsch et al.

(10) Patent No.: US 6,891,886 B2
(45) Date of Patent: May 10, 2005

(54) APPARATUS FOR FINELY SYNCHRONIZING CODE SIGNALS

(75) Inventors: Markus Doetsch, Schliern (CH); Peter Jung, Otterberg (DE); Jörg Plechinger, München (DE); Michael Schneider, München (DE); Patrick Feyfant, Golfe Juan (FR); Tideya Kella, München (DE); Peter Schmidt, Ellerstadt (DE)

(73) Assignee: Infineon Technologies AG, Munich (DE)

( * ) Notice: Subject to any disclaimer, the term of this patent is extended or adjusted under 35 U.S.C. 154(b) by 389 days.

(21) Appl. No.: 10/139,195

(22) Filed: May 6, 2002

(65) Prior Publication Data

US 2002/0181635 A1 Dec. 5, 2002

Related U.S. Application Data

(63) Continuation of application No. PCT/DE00/03859, filed on Nov. 2, 2000.

(30) Foreign Application Priority Data

Nov. 5, 1999 (DE) .......................... 199 53 350

(51) Int. Cl.⁷ .......................... H04B 1/69; H04L 27/06
(52) U.S. Cl. .................. 375/150; 375/343; 375/316
(58) Field of Search ............................ 375/130, 147, 375/150, 152, 343, 354–376, 316, 140

(56) References Cited

U.S. PATENT DOCUMENTS

| 5,090,028 | A | * | 2/1992 | Crebouw | 375/354 |
|---|---|---|---|---|---|
| 5,625,641 | A | * | 4/1997 | Takakusaki | 375/137 |
| 5,640,416 | A | | 6/1997 | Chalmers | 375/147 |
| 5,692,018 | A | * | 11/1997 | Okamoto | 375/347 |
| 5,903,597 | A | * | 5/1999 | Pon | 375/150 |
| 5,953,367 | A | * | 9/1999 | Zhodzicshsky et al. | 375/147 |
| 6,201,828 | B1 | * | 3/2001 | El-Tarhuni et al. | 375/150 |
| 6,549,559 | B2 | * | 4/2003 | Kamgar et al. | 375/134 |

FOREIGN PATENT DOCUMENTS

| DE | 196 81 752 T1 | 4/1999 |
|---|---|---|
| EP | 0 748 118 B1 | 12/1996 |
| WO | WO 99/34528 | 7/1999 |

OTHER PUBLICATIONS

Patent Abstracts of Japan No. 08–331188 A (Satoshi), dated Dec. 13, 1996.

* cited by examiner

*Primary Examiner*—Stephen Chin
*Assistant Examiner*—Jason M. Perilla
(74) *Attorney, Agent, or Firm*—Laurence A. Greenberg; Werner H. Stemer; Gregory L. Mayback

(57) ABSTRACT

An apparatus for finely synchronizing code signals with an encoded received signal includes a sampling device for sampling the received signal at regular sampling intervals, a pulse shaper for shaping the sampled received signal pulses in order to output a first and second pulse-shaped sample in dependence on an autocorrelation function, a buffer for buffering the two samples, a code signal generator for generating the code signal, correlation devices for correlating the generated code with the two buffered samples to form two correlation values, and an interpolation device for forming an interpolation value as a function of the two pulse-shaped samples and the deviation between the two correlation values.

15 Claims, 4 Drawing Sheets

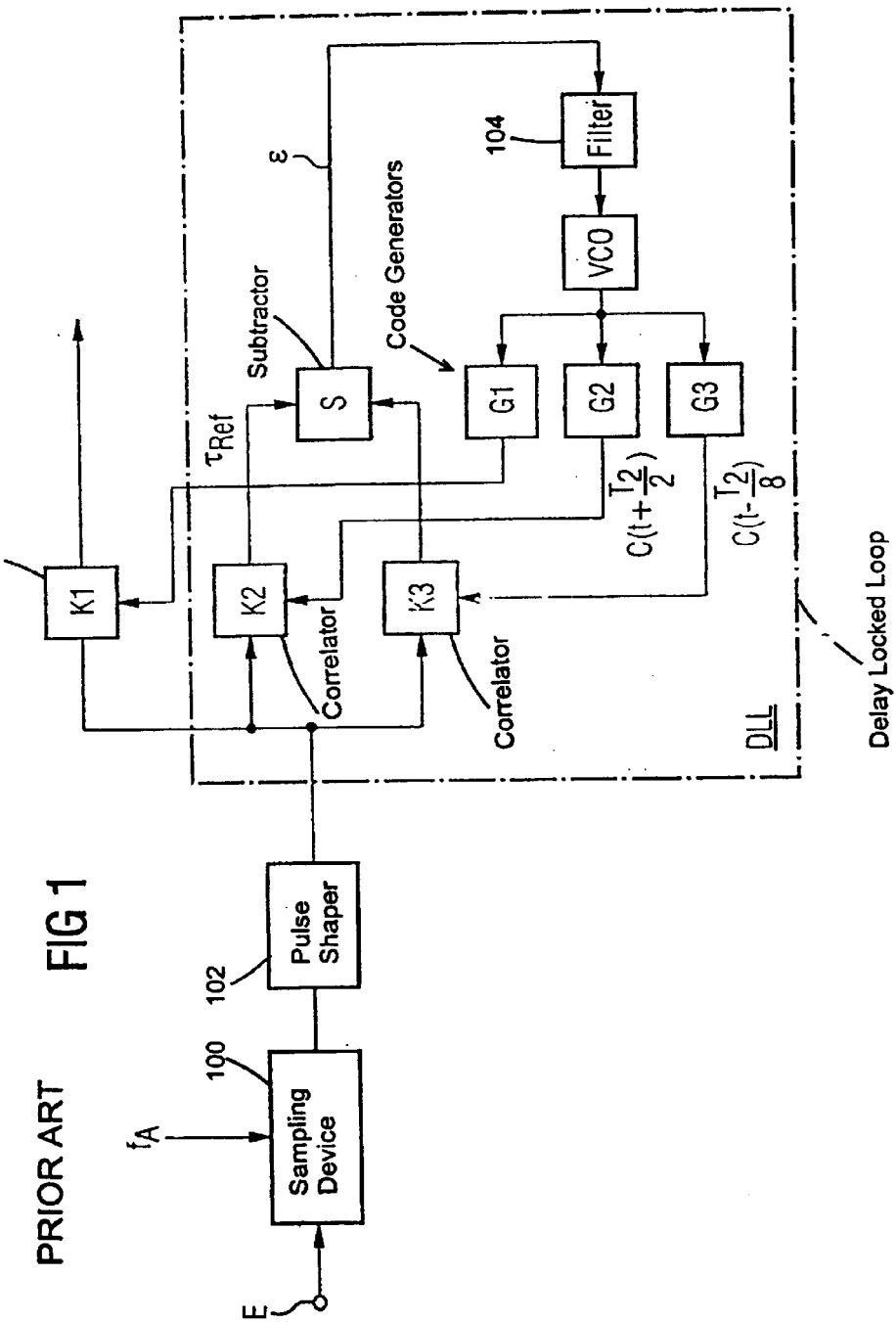

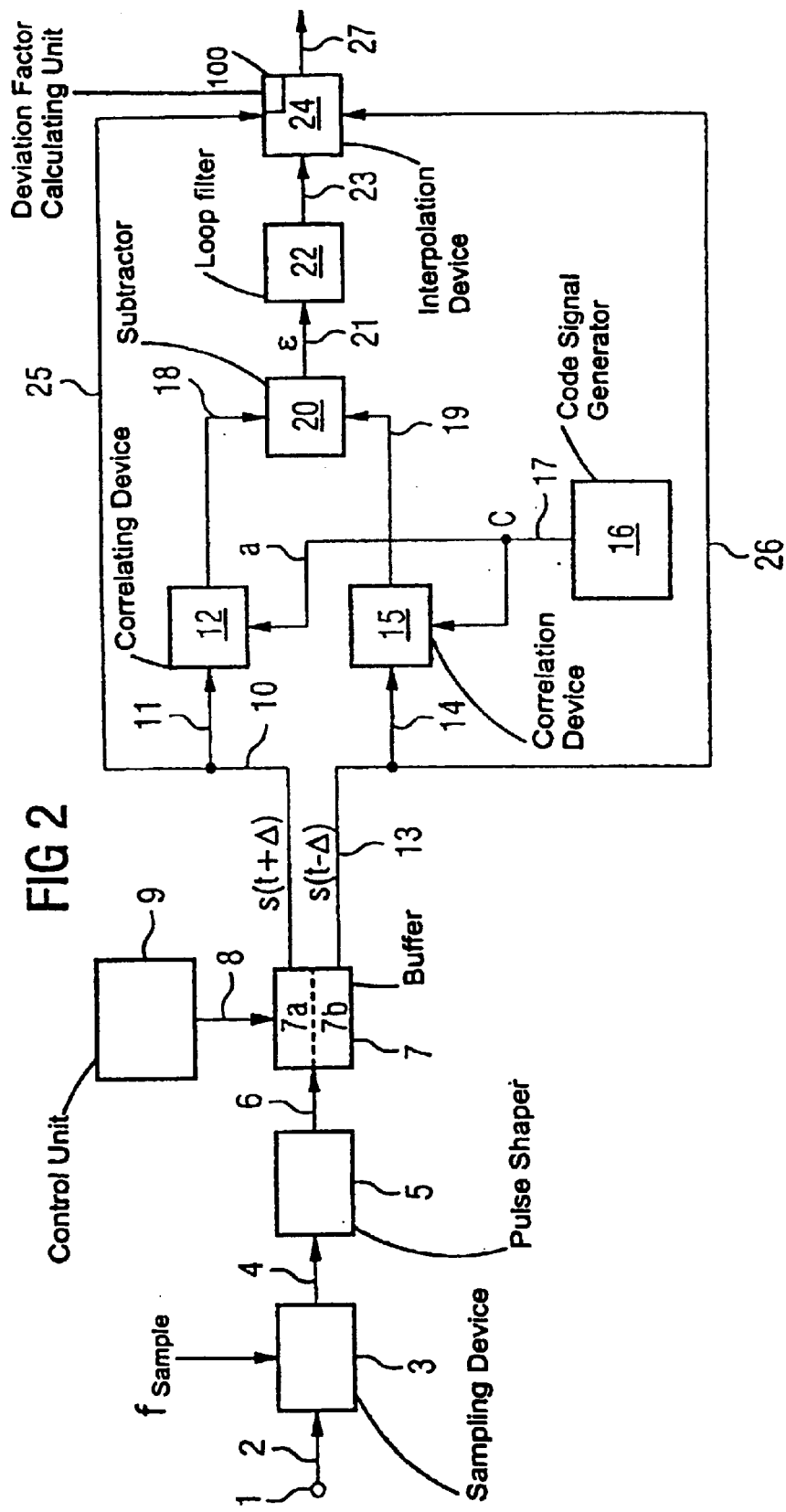

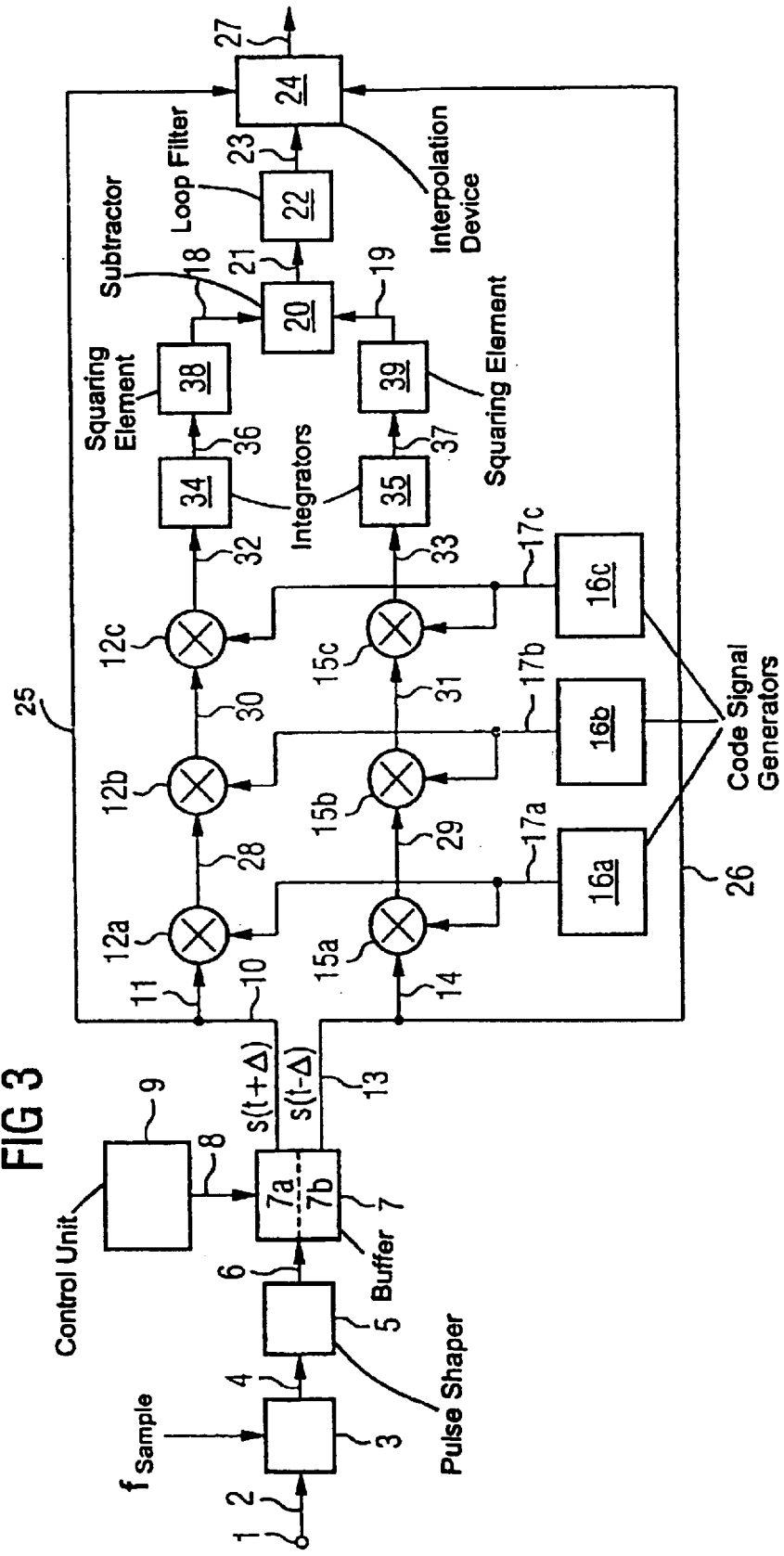

APPARATUS FOR FINELY SYNCHRONIZING CODE SIGNALS

CROSS-REFERENCE TO RELATED APPLICATION

This application is a continuation of copending International application No. PCT/DE00/03859, filed Nov. 2, 2000 which designated the United States and which was not published in English.

BACKGROUND OF THE INVENTION

Field of the Invention

The invention relates to an apparatus for finely synchronizing code signals with a coded received signal, in which locally generated code signals are brought into complete phase correspondence with the coded received signal.

FIG. 1 shows a prior art apparatus for finely synchronizing code signals with a coded received signal. A coded received signal passes via a signal input E to a sampling device 100 for sampling at a specific sampling frequency $f_A$. The sampled signal is fed to a pulse shaper 102 that has an autocorrelation function. Two consecutive samples pulse-shaped by the pulse shaper 102 are fed to three correlators K1, K2, K3. The correlators K1, K2, K3 are multipliers. The correlation devices K1, K2, K3 are connected respectively to code generators G1, G2, G3. The output correlation values of the correlators K2, K3 are subtracted by a subtractor S to form a difference signal or deviation signal $\epsilon$. The deviation signal $\epsilon$ passes via a loop filter 104 to a voltage-controlled oscillator VCO that drives the generators G1, G2, G3. The correlators K2, K3 and the subtractor S form a phase deviation detector for generating a phase deviation signal $\epsilon$. The phase detector, the loop filter 104, the voltage-controlled oscillator VCO, and the generators G2, G3 for the correlators K2, K3 form a DLL circuit (DDL: Delay Locked Loop). The generator G1 forms the difference code for the correlator K1, which correlates the received coded input signal with the reference code. The output signal of the correlator K1 is output for the purpose of further data processing such as descrambling and dechannelization and/or despreading.

The code generator G2 forms a code $C(t+T_c/2)$ leading by a specific time phase, and the code generator G3 forms a code $C(t-T_c/2)$ lagging by the same time phase. The voltage-controlled oscillator VCO drives the generators G2, G3 in such a way that the deviation signal $\epsilon$ is minimized. Because of this correction, the phase of the locally generated code is brought into complete correspondence with the phase of the coded received signal, or is synchronized.

The disadvantage in the case of the apparatus shown in FIG. 1 for fine synchronization consists in that a total of three code generators G1, G2, G3 are required to generate phase-shifted code signals. The outlay on circuitry in the prior art apparatus for fine synchronization is therefore very high.

SUMMARY OF THE INVENTION

It is accordingly an object of the invention to provide an apparatus for finely synchronizing a code signal with a coded received signal which overcomes the above-mentioned disadvantages of the prior art apparatus of this general type.

In particular, it is an object of the invention to create an apparatus for finely synchronizing a code signal with a coded received signal that requires only a code signal generator for generating the local code signal.

With the foregoing and other objects in view there is provided, in accordance with the invention, an apparatus for finely synchronizing a code signal with a coded received signal that includes: a sampling device for sampling the received signal at uniform sampling intervals, a pulse shaper for shaping the sampled received signal pulses in order to output a first and second pulse-shaped sample in dependence on an autocorrelation function; a buffer for buffering the two samples, a code signal generator for generating the code signal, a correlation device for correlating the generated code with the two buffered samples to form two correlation values, and an interpolation device for forming an interpolation value as a function of the two pulse-shaped samples and as a function of the deviation between the two correlation values.

In accordance with an added feature of the invention, the correlation devices are preferably multipliers.

In accordance with an additional feature of the invention, the code signal generator generates a scrambling code.

In accordance with another feature of the invention, the code signal generator generates a despreading code.

In accordance with a further feature of the invention, the correlation devices are preferably respectively connected downstream of integrators.

In accordance with a further added feature of the invention, a subtractor is provided for subtracting the correlation values in order to form a deviation signal.

In accordance with a further additional feature of the invention, a digital FIR (Finite Impulse Response) loop filter is preferably connected downstream of the subtractor.

In accordance with another added feature of the invention, the sampling interval is exactly half the chip duration $T_c$.

In accordance with another additional feature of the invention, the interpolation device is a linear TVI interpolator.

In accordance with yet an added feature of the invention, the interpolation device is a quadratic TVI interpolator.

In accordance with yet an additional feature of the invention, the interpolation device has a deviation factor calculating unit for calculating a deviation factor as a function of the deviation signal.

In accordance with yet another feature of the invention, the pulse shaper is an RRC filter.

Other features which are considered as characteristic for the invention are set forth in the appended claims.

Although the invention is illustrated and described herein as embodied in an apparatus for finely synchronizing code signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a prior art fine synchronization apparatus;

FIG. 2 shows an inventive apparatus for finely synchronizing a code signal with a coded received signal;

FIG. 3 shows another embodiment of the apparatus for finely synchronizing a code signal with a coded received signal.

DESCRIPTION OF THE PREFERRED EMBODIMENTS

Figure 4A:
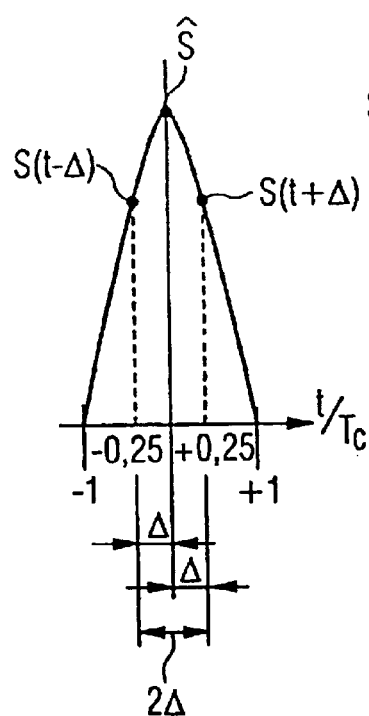
FIGS. 4a, 4b, and 4c show the formation of the two pulse-shaped samples in dependence on the autocorrelation function of the pulse shaper.

Referring now to the figures of the drawing in detail and first, particularly, to FIG. 2 thereof, there is shown an inventive apparatus for fine synchronization of a code signal with a coded received signal. The apparatus has a signal input 1 for receiving the coded received signal. The coded received signal is fed via a line 2 to a sampling device 3 that samples the coded received signal at a specific sampling frequency $f_{sample}$. The sampling frequency is a function of the chip duration $T_c$:

$$f_{sample} = 2/T_c$$

The sampled coded received signal is fed via a line 4 to a pulse shaper 5 for shaping the sampled received signal pulses. The pulse shaper 5 is required in order to minimize the intersymbol interference of the received signal. The pulse shaper 5 is preferably an RRC (Root Raised Cosine) filter with a specific normalized autocorrelation function ACF.

The autocorrelation function is prescribed by:

$$\varphi_{gg}(t) = \frac{\cos\left(\pi r \frac{t}{T_c}\right)}{1 - \left(2r\frac{t}{T_c}\right)^2} \text{sinc}\left(\frac{\pi t}{T_c}\right), 0 \leq r \leq 1,$$

where $T_c$ is the chip duration.

The output of the pulse shaper 5 is connected to a buffer 7 via a line 6. The buffer 7 has a first memory area 7a for a first leading pulse-shaped sample, and a second memory area 7b for a subsequent pulse-shaped sample. The buffer 7 is controlled by a control unit 9 via a control line 8. The control unit 9 drives the buffer 7 such that in each case the first sample is always buffered in the memory area 7a and the second sample is always buffered in the memory area 7b. The buffered previous sample s(t+Δ) is fed to a first correlation device 12 via a line 10 and a branching line 11. The subsequent sample s(t−Δ) buffered in the memory area 7b of the buffer 7 passes via a line 13 and a branching line 14 to a second correlation device 15. The correlation devices 12, 15 are preferably multiplier devices. A code signal generator 16 generates a code signal that is output, via a line 17, to the second correlation device 15 and to the first correlation device 12.

The two correlation devices 12, 15 receive the same code signal from a single code signal generator 16. The first correlation value, generated by the first correlation device 12, is applied to a subtractor 20 via a line 18. The second correlation value, generated by the second correlation device 15, is applied to the subtractor 20 via a line 19. The subtractor 20 subtracts the two correlation values present on the lines 18, 19 to form a difference signal or deviation signal ε that is output to a loop filter 22 via an output line 21 of the subtractor 20. The loop filter 22 is a digital FIR filter. The filtered deviation signal is fed via a line 23 to an interpolation device 24. The interpolation device 24 receives the first sample s(t+Δ) via a line 25 and the subsequent sample s(t−Δ) via a line 26, and outputs the generated interpolation value via a line 27 for the purpose of further data processing of the received signal. The interpolation device 24 is preferably a linear or quadratic TVI (Time Variant Interpolator) interpolator.

In a preferred embodiment, the interpolation device 24 includes a deviation factor calculating unit 100 for calculating a deviation factor N as a function of the filtered deviation signal ε.

The interpolation device 24 generates the interpolation value ŝ from the two pulse-shaped samples s and the deviation factor N in accordance with the following equation:

$$\hat{s} = Nx \frac{s(t+\Delta) - s(t-\Delta)}{4} + s(t-\Delta),$$

where $\Delta = T_c/4$, and thus is a quarter of the chip duration.

The circuitry requirement in the fine synchronization apparatus shown in FIG. 2 is relatively low, since only a code signal generator 16 is provided for generating the local code signal.

FIG. 3 shows a particularly preferred embodiment of the inventive fine synchronization apparatus. Identical reference symbols in this case denote components identical to those in FIG. 2. In the case of the fine synchronization apparatus shown in FIG. 3, a plurality of different local code signals are synchronized with the coded received signal. The code signal generator 16a generates a scrambling code that is output via the line 17a to the multipliers 12a, 15a in order to decrypt the samples. The decrypted samples are fed via lines 28, 29 to the downstream multipliers 12b, 15b. The code signal generator 16b generates a despreading code and/or analyzing code. The despreading code is fed via the line 17b to the two multipliers 12b, 15b, which multiply the despreading code with the decrypted samples present on the lines 28, 29.

The decrypted and despread samples are fed via lines 30, 31 to the downstream multipliers 12c, 15c. The multipliers 12c, 15c receive, via the line 17c, pilot symbols for multiplying with the decrypted and despread samples present on the lines 30, 31. The output of the multipliers 12c, 15c are connected via lines 32, 33 to integrators 34, 35 that carry out time integration over a specific period that is preferably half the chip duration $T_c$. The integrated signals pass via lines 36, 37 to signal squaring elements 38, 39. The outputs of the signal squaring elements 38, 39 are connected to the subtractor 20 via the lines 18, 19. The sampling signals s(t−Δ) and s(t−Δ) illustrated in FIGS. 2, 3 are complex signals.

Figure 4B:
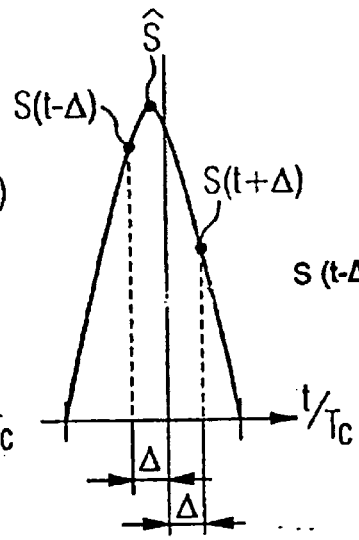
Figure 4C:
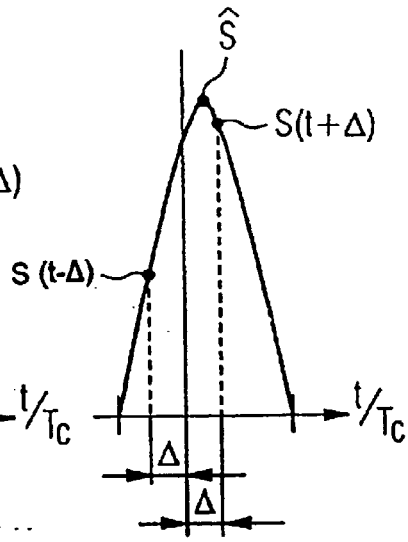

FIGS. 4a–4c show various sampling situations using the autocorrelation function of the sampling pulse shaper 5. In this case, Δ=Tc/4 is therefore a quarter of the chip duration.

FIG. 4a shows the ideal case of correctly timed sampling. In the case of accurately timed sampling, the level of the first sample of s(t+Δ) and of the second sample s(t−Δ) is of exactly the same height, and so the deviation signal ε is 0. The interpolation device 24 calculates the interpolation estimate ŝ from the two samples for the purpose of further data processing.

FIG. 4b shows the situation in the case of sampling that is too late, where the preceding sample s(t+Δ) has a smaller value than the subsequent sample s(t−Δ). The interpolation device 24 calculates the interpolation estimate ŝ once again from the two samples and the deviation ε between the correlation values formed from samples.

FIG. 4c shows the reverse situation, in which sampling is performed too early. Here, the first sample s(t+Δ) is greater than the subsequent sample s(t−Δ). The interpolation device 24 once again calculates the interpolation estimate ŝ as a function of the two samples and of the deviation between the correlation values formed from the samples.

By contrast with the prior art, in the case of the inventive apparatus, it is not phase-shifted codes that are used for correlation, but time-shifted sampled data that lead or lag by $T_c/4$ by comparison with an estimated optimum sampling instant. It is possible in this way to provide a single clock source as the time reference signal inside the fine synchronization apparatus, and thus a single chip clock signal for the entire receiver. The optimum sampling time is therefore determined with a very low outlay on circuitry. Since the sampling rate is half of the chip duration, a resolution of $T_c/8$ is required in order to determine and compensate time deviations of this order of magnitude.

We claim:

1. An apparatus for finely synchronizing code signals with a coded received signal, comprising:
   a sampling device for sampling the received signal at regular sampling intervals to obtain sampled received signal pulses;
   a pulse shaper for shaping the sampled received signal pulses in order to output a first pulse-shaped sample and a second pulse-shaped sample in dependence on an autocorrelation function;
   a buffer for buffering the first pulse-shaped sample and the second pulse-shaped sample to obtain a buffered first pulse-shaped sample and a buffered second pulse-shaped sample;
   a code signal generator for generating a code signal;
   correlation devices for correlating the code signal with the buffered first pulse-shaped sample and the buffered second pulse-shaped sample to form two correlation values; and
   an interpolation device for forming an interpolation value as a function of the buffered first pulse-shaped sample and the buffered second pulse-shaped sample and as a function of a deviation between the two correlation values.

2. The apparatus according to claim 1, wherein said correlation devices are multipliers.

3. The apparatus according to claim 2, wherein said code signal generator generates a decryption code.

4. The apparatus according to claim 1, wherein said code signal generator generates a despreading code.

5. The apparatus according to claim 1, comprising:
   integrators respectively connected downstream from said correlation devices.

6. The apparatus according to claim 1, comprising:
   a subtractor for subtracting the two correlation values in order to obtain the deviation between the two correlation values.

7. The apparatus according to claim 6, comprising:
   a digital FIR loop filter connected downstream from said subtractor.

8. The apparatus according to claim 1, wherein said sampling device samples the received signal at a sampling interval that is half of a chip duration $T_c$.

9. The apparatus according to claim 1, wherein said interpolation device is a linear time variant interpolator.

10. The apparatus according to claim 1, wherein said interpolation device is a quadratic time variant interpolator.

11. The apparatus according to claim 1, wherein said interpolation device has a deviation factor calculating unit for calculating a deviation factor N as a function of a deviation signal $\epsilon$.

12. The apparatus according to claim 11, wherein said interpolation device calculates the interpolation value ŝ from the buffered first pulse-shaped sample $s(t+\Delta)$, the buffered second pulse-shaped sample $s(t-\Delta)$, and the deviation factor N using the equation:

$$\hat{s}(t) = Nx \frac{s(t+\Delta) - s(t-\Delta)}{4} + s(t-\Delta),$$

where t is time and $\Delta$ is a chip duration $T_c$ divided by 4.

13. The apparatus according to claim 1, wherein said pulse shaper is an RRC filter.

14. The apparatus according claim 1, wherein said pulse shaper has an autocorrelation function in accordance with:

$$\varphi_{gg}(t) = \frac{\cos\left(\pi r \frac{t}{T_c}\right)}{1 - \left(2r \frac{t}{T_c}\right)^2} \operatorname{sinc}\left(\frac{\pi t}{T_c}\right), 0 \leq r \leq 1,$$

where: $\phi$ is the autocorrelation function over time, t is time, r is a value from 0 to 1, and $T_c$ is a chip duration.

15. The apparatus according to claim 1, wherein said code signal generator generates a decryption code.

* * * * *